J. PIGOT.
Self-Closing Stop-Cocks.

No. 138,580.  Patented May 6, 1873.

Witnesses:  Inventor:

UNITED STATES PATENT OFFICE.

JAMES PIGOT, OF BROOKLYN, NEW YORK.

IMPROVEMENT IN SELF-CLOSING STOP-COCKS.

Specification forming part of Letters Patent No. 138,580, dated May 6, 1873; application filed April 5, 1873.

*To all whom it may concern:*

Be it known that I, JAMES PIGOT, of Brooklyn, in the county of Kings and State of New York, have invented a new and Improved Self-Closing Stop-Cock, of which the following is a specification:

My invention consists of a coiled spring and an arm, combined with the plug of a stop-cock to close the cock self-actingly, the spring being arranged on a curved rod for keeping it in place, and the arm being attached to the plug at one end, and arranged at the other end so as to swing along the rod, so that the spring thereon will bear against it and be contracted when the cock is opened, and will press the arm around and close the cock as soon as the handle is let go; and in order to insure the plug against being pressed into the hole in which it works with such force as to hold it with too much friction for the spring to close it—which it is liable to be with the screws commonly used for that purpose—and yet hold it with sufficient pressure to be water-tight, which the screws are not certain to do in all cases, I dispense with the screw and use a presser-rod, a coiled spring, and an adjustable nut for holding it, the presser-rod having a bearing in the center of the top of the plug and passing through a supporting-piece attached to the case for the plug, so as to have endwise motion, and the spring being arranged on the rod on the other side of the support, between it and the nut which screws on the rod, and holds the spring so as to cause it to press the rod on the plug with the exact pressure required, which can be adjusted by screwing the nuts up or down.

Figure 1:
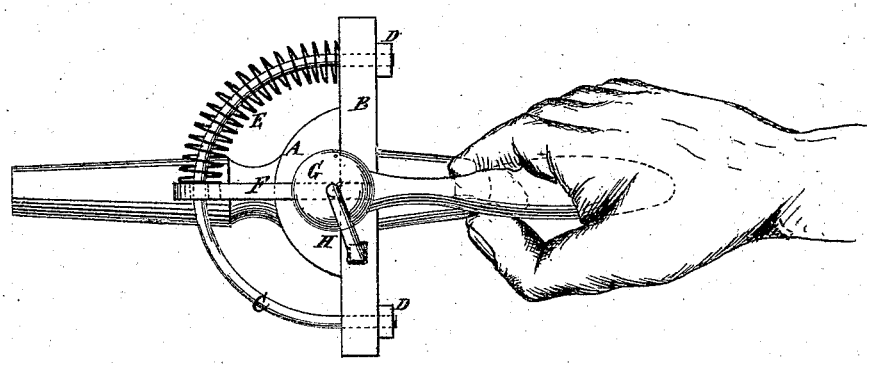
Figure 2:
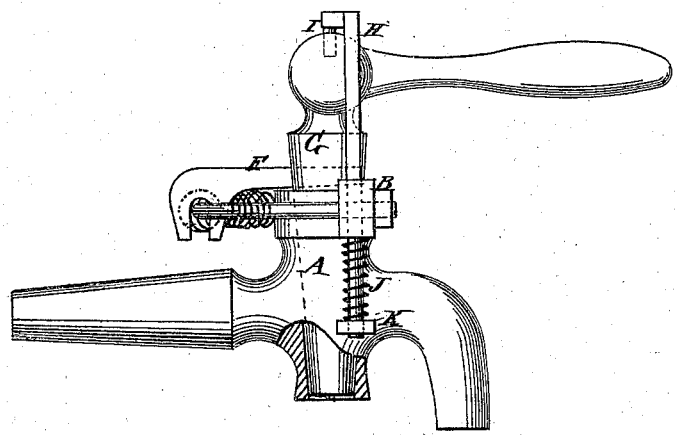

Figure 1 is a plan view of my improved self-closing stop-cock, and Fig. 2 is a side elevation with a part of the case broken out.

Similar letters of reference indicate corresponding parts.

A is the case of an ordinary stop-cock, to the top of which I apply a horizontal bar, B, at right angles to the longitudinal direction of the tube, and in this bar I arrange a small rod, C, bent into a semicircular form, with the end portion extending beyond the diametrical line of the circle sufficiently to pass through the bar to be secured to it detachably by nuts D. E is the coiled spring to close the cock, and for which this rod is designed for a support. F is the arm, attached to the plug G at one end, and having a notch at the other, embracing the rod C, so that the spring which is arranged between it and one end of bar B will press the arm around, and thereby close the cock when it is open, and the handle let go. H is the presser-bar for holding the plug down; it has a little point, I, at one end, bearing in a socket in the top of the plug, and extends down through a hole in the bar B and a considerable distance beyond, to receive a coiled spring, J, between the lower side of the bar B and a nut, K, which screws on it from the lower end, to contract the spring and cause the rod to hold the plug down in its seat with the requisite pressure to keep it water-tight, but no more, so that the closing of the cock by the spring E will not be prevented.

The hole through the bar B for the presser-rod and the rod are square, so that the rod cannot be turned by the cock, as it might otherwise be, and thus be caused to bind in the socket, or the point might be thrown out of the socket.

The object of the invention is to economize water, and prevent the damage sometimes caused when the cocks are left open at night, and the waste-pipes happen to be stopped, so that the water overflows.

Having thus described my invention, I claim as new and desire to secure by Letters Patent—

1. The combination of the arm F, spring E, and rod C, with the plug of a stop-cock, substantially as specified.

2. The combination of the presser-bar H, spring J, and nut K, with the plug of a stop-cock, substantially as specified.

3. The arrangement of the bar B, rod C, spring E, arm F, rod H, spring J, and nut K, with a stop-cock, substantially as specified.

JAMES PIGOT.

Witnesses:
T. B. MOSHER,
ALEX. F. ROBERTS.